United States Patent [19]

Ueda

[11] Patent Number: 4,865,431
[45] Date of Patent: Sep. 12, 1989

[54] ZOOM LENS SYSTEM FOR USE IN AN IMAGE PROJECTING APPARATUS WITH KÖHLER ILLUMINATION

[75] Inventor: Toshihiko Ueda, Osaka, Japan

[73] Assignee: Minolta Camera Kabushiki Kaisha, Osaka, Japan

[21] Appl. No.: 183,781

[22] Filed: Apr. 21, 1988

[30] Foreign Application Priority Data

Apr. 23, 1987 [JP] Japan ................. 62-100954
Jul. 22, 1987 [JP] Japan ................. 62-184377

[51] Int. Cl.$^4$ ................. G02B 15/14; G02B 9/60; G02B 9/62
[52] U.S. Cl. ................. 350/427; 350/449
[58] Field of Search ............. 350/427, 426, 412, 449, 350/464

[56] References Cited

U.S. PATENT DOCUMENTS 4,278,334  7/1981  Maeda .
4,433,906  2/1984  Nakatami et al. .

FOREIGN PATENT DOCUMENTS 57-73715  5/1982  Japan .
0183613  8/1986  Japan .................. 350/449

*Primary Examiner*—Bruce Y. Arnold
*Assistant Examiner*—Rebecca D. Gass
*Attorney, Agent, or Firm*—Price, Gess & Ubell

[57] ABSTRACT

The disclosure relates to a zoom lens system for use in an image projecting apparatus with Köhler illumination. In this system, an aperture stop is movably provided relative to the movement of a first and second lens groups in an operation of zooming so as to make a pupil position of the zoom lens system at a reduction side invariable, with the result that Köhler illumination system is not moved.

8 Claims, 6 Drawing Sheets

ZOOM LENS SYSTEM FOR USE IN AN IMAGE PROJECTING APPARATUS WITH KöHLER ILLUMINATION

BACKGROUND OF THE INVENTION

1. Field of the Invention:

The present invention relates to a zoom lens system for use in an image projecting apparatus with Kuml/o/ hler illumination, and more particularly to a projecting lens system wherein a pupil position of a zoom lens system is made invariable in an operation of zooming so as to satisfy the conditions of Kuml/o/ hler illumination without changing the position of a condensing lens system of Kuml/o/ hler illumination system.

2. Description of the Prior Arts:

Kuml/o/ hler illumination has frequently been used in a projecting optical system since it has conventionally given an image having a uniform illumination intensity. One example of such projecting optical system employing Kuml/o/ hler illumination system is a system for projecting images of microfilms.

A microfilm image projecting optical system employing conventional Kuml/o/ hler illumination system will be explained hereinbelow with reference to FIG. 1. Specifically, the projecting lens system is a zoom lens system comprising from the enlargement side, i.e., from a screen 8, an aperture stop 7, a first lens group 5 of a positive refractive power and a second lens group 6 of a negative refractive power. This lens system projects an image on a film 4 to the screen 8 with the magnification varied. In order to illuminate the film 4, luminous flux from a light source 1 is formed parallel by a first condensing lens unit 2. Then, the image of the light source 1 is formed at the position of the aperture stop 7 of the projecting zoom lens system by a second condensing lens unit 3. In this way, the filament image of the light source 1 is formed at the pupil position of the projecting lens system by transparently illuminating the film 4, with the result that the conditions of Kuml/o/ hler illumination is satisfied as well as an the image having a uniform and effective illumination density is projected on the screen 8.

As described above, the projecting lens system is a zoom lens system. Therefore, the position of the aperture stop 7 is altered in an operation of zooming from the longest focal length side shown in FIG. 1A to the shortest focal length side shown in FIG. 1B, the result of which is that the conditions of Kuml/o/ hler illumination are not fulfilled. Accordingly, this projecting optical system is constructed such that either the first or second condensing lens group 2 or 3, or alternatively the whole condensing lens group is moved to fulfill the conditions of Kuml/o/ hler illumination.

Namely, in order to maintain the conditions of Kuml/o/ hler illumination in the operation of zooming, the condensing lens system has to be manually adjusted by users or to be moved in a mechanically interlocking relation with the zoom lens system, causing trouble in operating the machine or entailing an increased cost of the machine.

SUMMARY OF THE INVENTION

The main object of the present invention is to provide a zoom lens system for use in an image projecting apparatus with Kuml/o/ hler illumination which always fulfills the conditions of Kuml/o/ hler illumination without changing the arrangement of a condensing lens system.

Another object of the present invention is to provide a zoom lens system for use in an image projecting apparatus with Kuml/o/ hler illumination wherein an aperture stop is independently moved to make the pupil position at the reduction side invariable in an operation of zooming.

These and other objects of the present invention can be accomplished by providing a zoom lens system for use in an image projecting apparatus in which an image on an object plane is illuminated by a Kuml/o/ hler illumination system and is enlargingly projected by the zoom lens system to an image plane apart from the object plane by a definite distance, said zoom lens system comprising first and second lens groups disposed in this order from the image plane and being movable along an optical axis while maintaining a positional relationship for zooming; and an aperture stop disposed between the image plane and the first lens group and being movable so as to make the pupil position of the zoom lens system at a reduction side invariable in an operation of zooming.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 2A and 3A show said arrangements at the longest focal length side, while FIGS. 2B and 3B at the shortest focal length side;

FIGS. 4A and 5A show said arrangements at the longest focal length side, while FIGS. 4B and 5B at the shortest focal length side;

DETAILED DESCRIPTION OF THE PREFERRED EMBODIMENTS

A first model system of the present invention will be explained hereinbelow with reference to FIGS. 2A, 2B, 3A and 3B.

Figure 2:
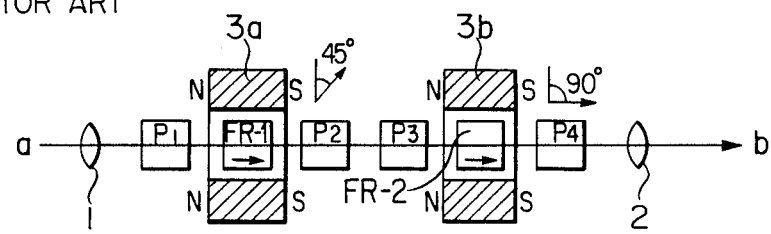
FIGS. 2(2A, 2B) and 3(3A and 3B) are diagrams showing paraxial refractive power arrangements in a zoom lens system according to a first model of the present invention.
Figure 3:
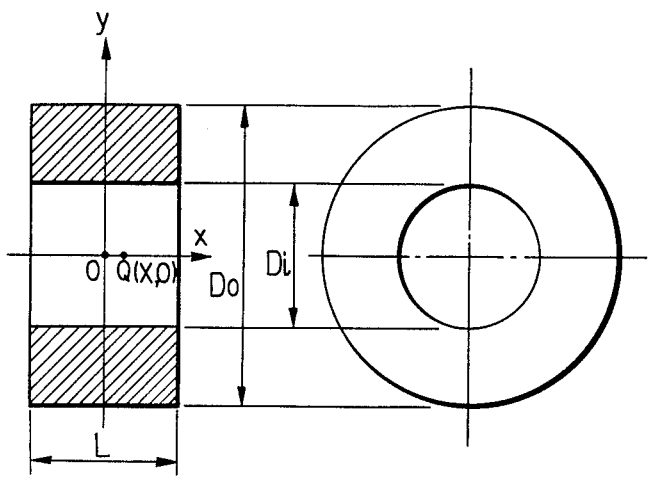

FIG. 2 shows a two-component zoom lens system at a definite object-image distance comprising, from the enlargement side, i.e., an image plane (screen 8) side, an aperture stop 7, a first lens group 5 of a positive refractive power and a second lens group 6 of a negative refractive power. FIG. 2A illustrates a condition in the longest focal length side, and FIG. 2B in the shortest focal length side.

Zooming operation from the longest focal length side to the shortest focal length side is carried out in this zoom lens system by moving both the first lens group 5 of a positive refractive power and the second lens group 6 of a negative refractive power to an object plane (film 4) side so as to increase a distance between both lens groups. The film 4 is illuminated by a Kuml/o/ hler illumination system (not shown).

Next, an example in the above-mentioned projecting lens system for fixing a pupil position at the reduction side will be explained with reference to a paraxial refractive power arrangement.

As shown in FIGS. 2A and 2B, the various factors of the lens system according to the first model are defined as follows:

$\Psi_1$: refractive power of the first lens group 5 of a positive refractive power (reciprocal number of a focal length) ($\Psi_1 > 0$), $\Psi_2$: refractive power of the second lens group 6 of a negative refractive power ($\Psi_2 < 0$), $e_1$: optical distance from the first lens group 5 of a positive refractive power to the second lens group 6 of a negative refractive power in the operation of zooming at the longest focal length side ($e_1 > 0$), $S_1$: distance from the first lens group 5 of a positive refractive power to the image plane 8 at the longest focal length side ($S_1 < 0$), $a_1$: distance from the second lens group 6 of a negative refractive power to the image point by the second lens group 6 of a negative refractive power relative to the object point on the object plane 4 at the longest focal length side ($a_1 > 0$), $b_1$: distance from the second lens group 6 of a negative refractive power to the object plane 4 at the longest focal length side ($b_1 > 0$), x: distance of movement of the second lens group 6 of a negative refractive power from the longest focal length side ($x > 0$), y: distance of movement of the first lens group 5 of a positive refractive power from the longest focal length side ($y > 0$), a: distance from the second lens group 6 of a negative refractive power to the image point by the second lens group 6 upon the movement of the second lens group 6 in an amount of x ($a > 0$)

(I) Paraxial image forming conditions at the longest focal length side are represented as follows:

Concerning the second lens group 6 of a negative refractive power, $$-\frac{1}{a_1} + \frac{1}{b_1} = \psi_2 \quad (1)$$

Concerning the first lens group 5 of a positive refractive power 5, $$-\frac{1}{S_1} + \frac{1}{e_1 + a_1} = \psi_1 \quad (2)$$

(II) Paraxial conditions are represented as follows when the second lens group 6 of a negative refractive power moves in an amount of x:

Concerning the second lens group 6 of a negative refractive power, $$-\frac{1}{a} + \frac{1}{b_1 - x} = \psi_2 \quad (3)$$

The magnification is obtained from the following condition:

$$\beta_2 = \frac{b_1 - x}{a} \quad (4)$$

Concerning the first lens group 5 of a positive refractive power, $$-\frac{1}{S_1 - y} + \frac{1}{e_1 - y + x + a} = \psi_1 \quad (5)$$

The magnification is obtained from the following condition:

$$\beta_1 = \frac{e_1 - y + x + a}{S_1 - y} \quad (6)$$

From the condition (5), $$\psi_1 y^2 + Ay + B = 0 \quad (7)$$

wherein $$A = -\psi_1 (x + a + s_1 + e_1) \quad (8)$$

$$B = \psi_1 s_1 (x + a + e_1) + x + a + e_1 - s_1$$

From the above-mentioned condition (3), the variable a is represented as follows:

$$a = \frac{b_1 - x}{1 - \psi_2 (b_1 - x)} \quad (9)$$

($a = a_1$ when $x = 0$)

Since $y > 0$, $$y(x) = \frac{-A + \sqrt{A^2 - 4\psi_1 B}}{2\psi_1}$$

Therefore, y can be written as a function of x.

Subsequently, explained hereinbellow are the conditions for moving the position of the aperture stop in order to fix the pupil position at the reduction side.

As shown in FIGS. 3A and 3B, the various factors are defined as follows:

$e_2$: optical distance from the first lens group 5 of a positive refractive power to the position of the aperture stop 7 at the longest focal length side ($e_2 < 0$), $c_1$: distance from the first lens group 5 of a positive refractive power to the image point P of the aperture stop 7 by the first lens group 5 of a positive refractive power ($c_1 < 0$), $d_1$: distance from the second lens group 6 of a negative refractive power to the image point by the second lens group 6 in the case where the image point P of the aperture stop 7 by the first lens group 5 of a positive refractive power is defined as an object point ($d_1 < 0$), c, d: values corresponding to the $c_1$ and $d_1$ respectively in the case where the first and second lens groups 5 and 6 move in amounts of y and x, Z: an amount of movement of the aperture stop 7

(III) Pupil position at the longest focal length side

The image forming condition concerning the first lens group of a negative refractive power 6 is represented as follows:

$$-\frac{1}{e_2} + \frac{1}{c_1} = \psi_1 \quad (10)$$

Concerning the second lens group 6 of a negative refractive power, $$-\frac{1}{c_1 - e_1} + \frac{1}{d_1} = \psi_2 \quad (11)$$

The pupil position at the reduction side is represented as follows:

$$P_I = d_1 - b_1 \quad (12)$$

(IV) Pupil position upon the zooming movement of the first and second lens groups 5 and 6:

The image forming condition concerning the first lens group 5 of a positive refractive power is represented as follows:

$$-\frac{1}{e_2 - y + z} + \frac{1}{c} = \psi_1 \quad (13)$$

Concerning the second lens group 6 of a negative refractive power, $$-\frac{1}{c - e_1 - x + y} + \frac{1}{d} = \psi_2 \quad (14)$$

The pupil position at the reduction side is represented as follows:

$$P_{II} = d - (b_1 - x)$$

Since the condition for making the pupil position invariable at the reduction side is $P_I = P_{II}$, $$d = d_1 - x \quad (15)$$

From the condition (10), $$c_1 = \frac{e_2}{\psi_1 e_2 + 1} \quad (16)$$

From the condition (11), $$d_1 = \frac{c_1 - e_1}{\psi_2(c_1 - e_1) + 1} \quad (17)$$

Z is obtained by eliminating c from the conditions (13) and (14):

$$Z = \frac{(\psi_2 d - 1)(y - e_2) - \{(\psi_2 d - 1)(y - x - e_1) + d\}\{\psi_1(e_2 - y) + 1\}}{\{(\psi_2 d - 1)(y - x - e_1) + d\}\psi_1 + (\psi_2 d - 1)} \quad (18)$$

Therefore, since y is written as a function of x from the condition (9), the amount of movement Z of the aperture stop can be represented as a function x with the values $\psi_1$, $\psi_2$, $e_1$, $e_2$ and $b_1$ defined as an initial value.

Specifically, the pupil position can be maintained at the reduction side by affording the amount of movement obtained by the condition (18) to the aperture stop 7 in accordance with the movements of the first and second lens groups.

Subsequently, another model system of the present invention will be explained hereinbelow with reference to FIGS. 4A, 4B, 5A and 5B.

Figure 4:
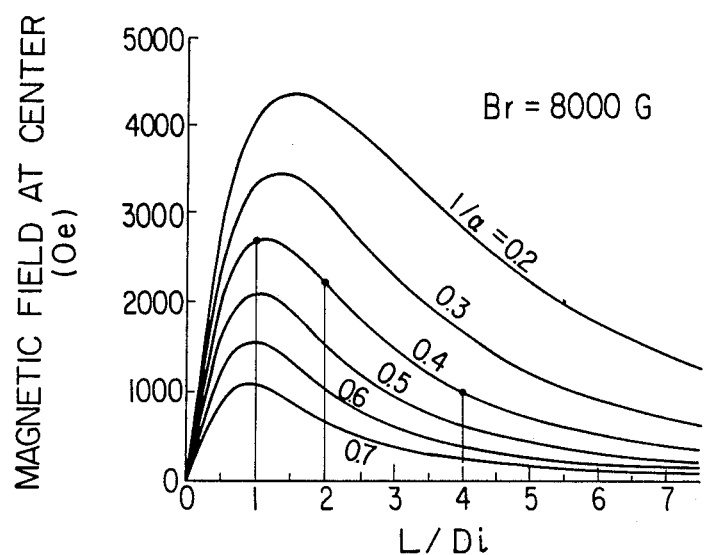
FIGS. 4(4A, 4B) and 5(5A and 5B) are diagrams showing paraxial refractive power arrangements in a zoom lens system according to a second model of the present invention.
Figure 5:
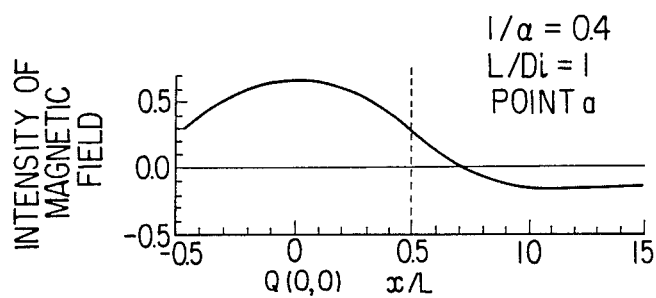

The structure is almost the same as that explained before except that the first lens group has a negative refractive power and the second lens group has a positive refractive power. Namely, as shown in FIG. 4, a zoom lens system of this model comprises from the enlargement side, i.e., an image plane side 8, an aperture stop 7, a first lens group 5a of a negative refractive power and second lens group 6a of a positive refractive power.

As for the paraxial conditions, the factors and conditions are defined by almost the same manner as those described before. However, with regard to the factors $\Psi_1$, $\Psi_2$, $a_1$ and the conditions $\beta_1$ and $\beta_2$, the marks of plus and minus are opposite to those of the above-mentioned model.

The paraxial conditions for the zoom lens system of the second model are represented by the same equations as those (1) to (8) described above.

However, since the marks of plus and minus are opposite to the factors as mentioned before, the condition (9) is written as follows:

$$y(x) = \frac{-A - \sqrt{A^2 - 4\psi_1 B}}{2\psi_1}$$

The factors and conditions for moving the aperture stop are identical with the former explained model system, therefore, the results and effects are also identical with the same.

Namely, the pupil position can be maintained at the reduction side by affording the amount of movement Z defined by the equation (18) to the aperture stop 7.

The first and second embodiments of the projecting lens systems applying the former and latter model systems of the invention are shown in Tables 1 and 2 respectively. In these tables, r is the radius of curvature, d is the axial distance, N is the refractive index and ν is the Abbe number. Further, each projecting lens system is sectionally illustrated in FIGS. 6 and 7.

Figure 6:
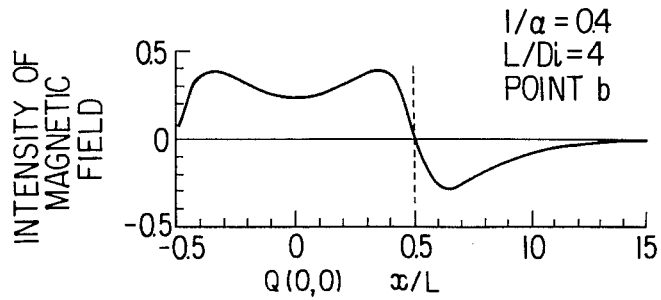
FIG. 6 is a diagram in section showing a lens system applying the first model.

Referring to FIG. 6, a zoom lens system according to the first model of the present invention has from the enlargement side (left side of the drawing) an aperture stop S, a first lens group $\Psi_1$ of a positive refractive power and a second lens group $\Psi_2$ of a negative refractive power. A transparent glass plate ($r_{15}$, $r_{16}$) disposed at the right side of the lens system supports a microfilm (not shown) on the right side thereof. The first lens group $\Psi_1$ consists of a bi-convex lens ($r_1$, $r_2$), bi-concave lens ($r_3$, $r_4$), bi-convex lens ($r_5$, $r_6$) and a meniscus lens ($r_7$, $r_8$) and a bi-convex lens ($r_8$, $r_9$) which are cemented together. The second lens group $\Psi_2$ consists of a meniscus lens ($r_{10}$, $r_{11}$) and a meniscus lens ($r_{12}$, $r_{13}$) and a bi-convex lens ($r_{13}$, $r_{14}$) which are cemented together.

Figure 7:
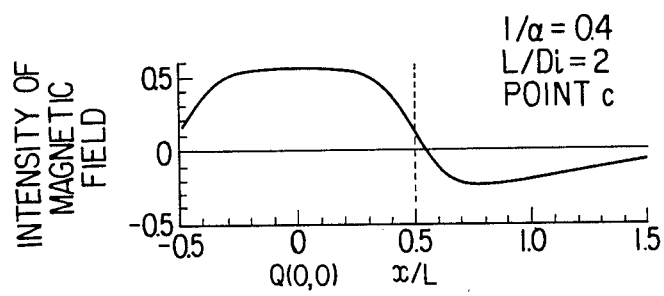
FIG. 7 is a diagram in section showing a lens system applying the second model.
Figure 8:
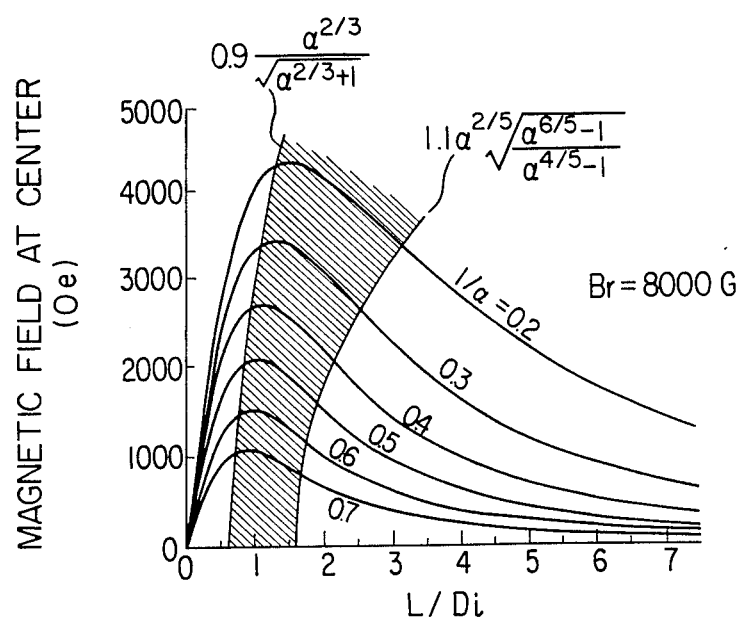
Figure 9:
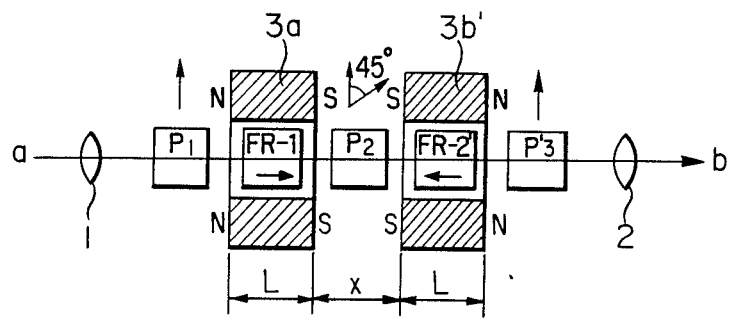
Figure 10:
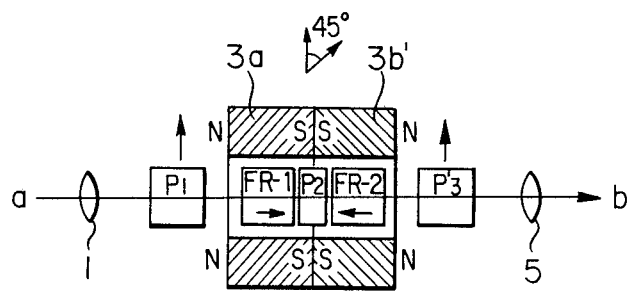
Figure 13:
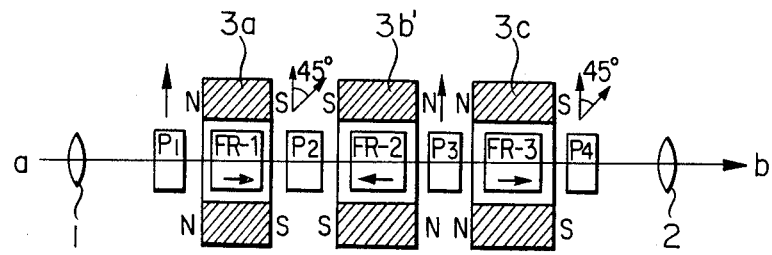
Figure 11:
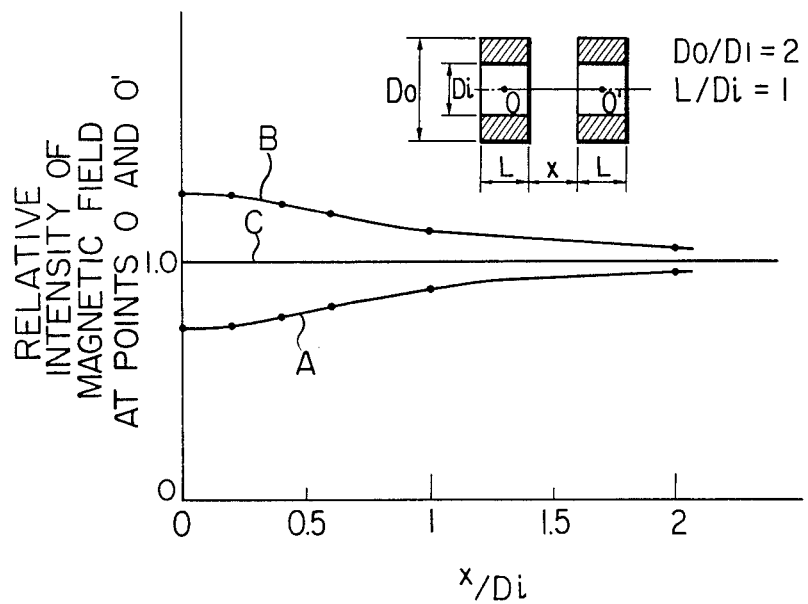
Figure 12:
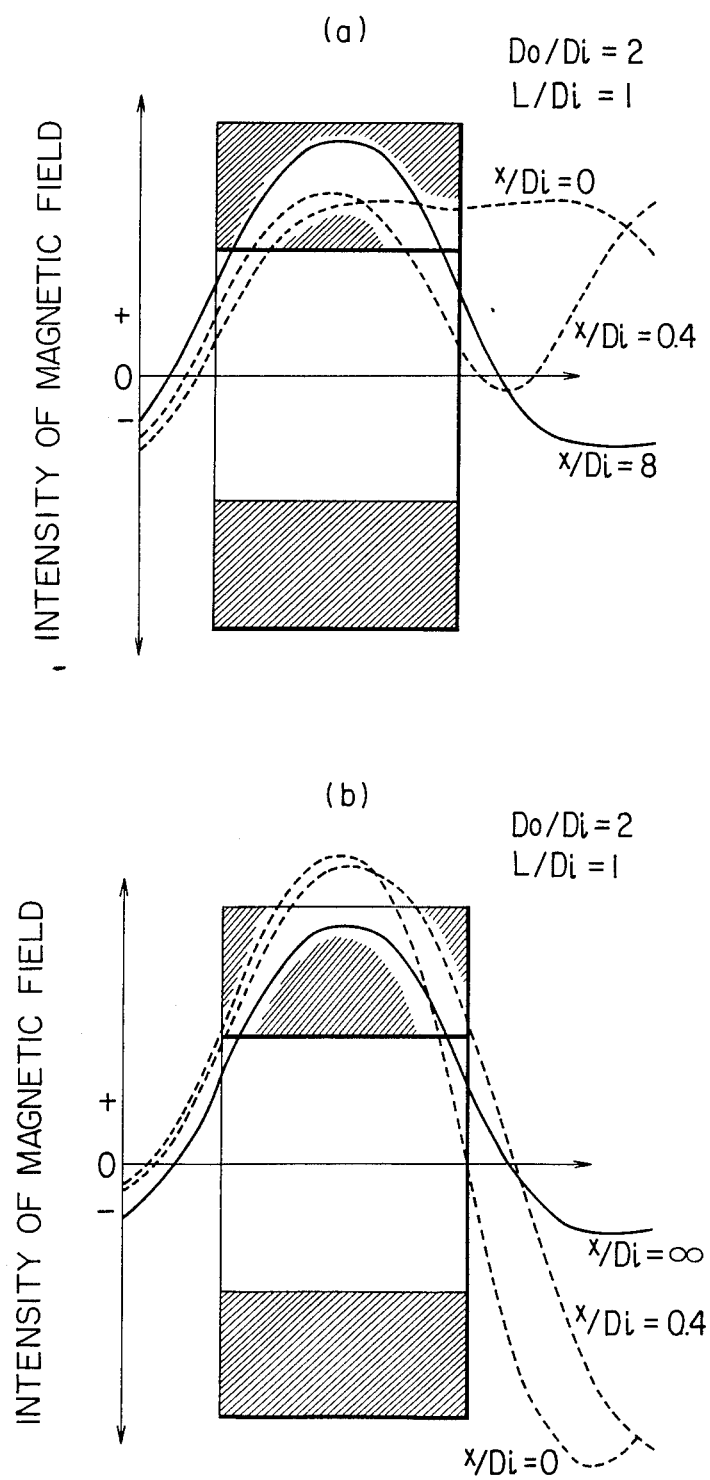
Figures 1A, 1B:
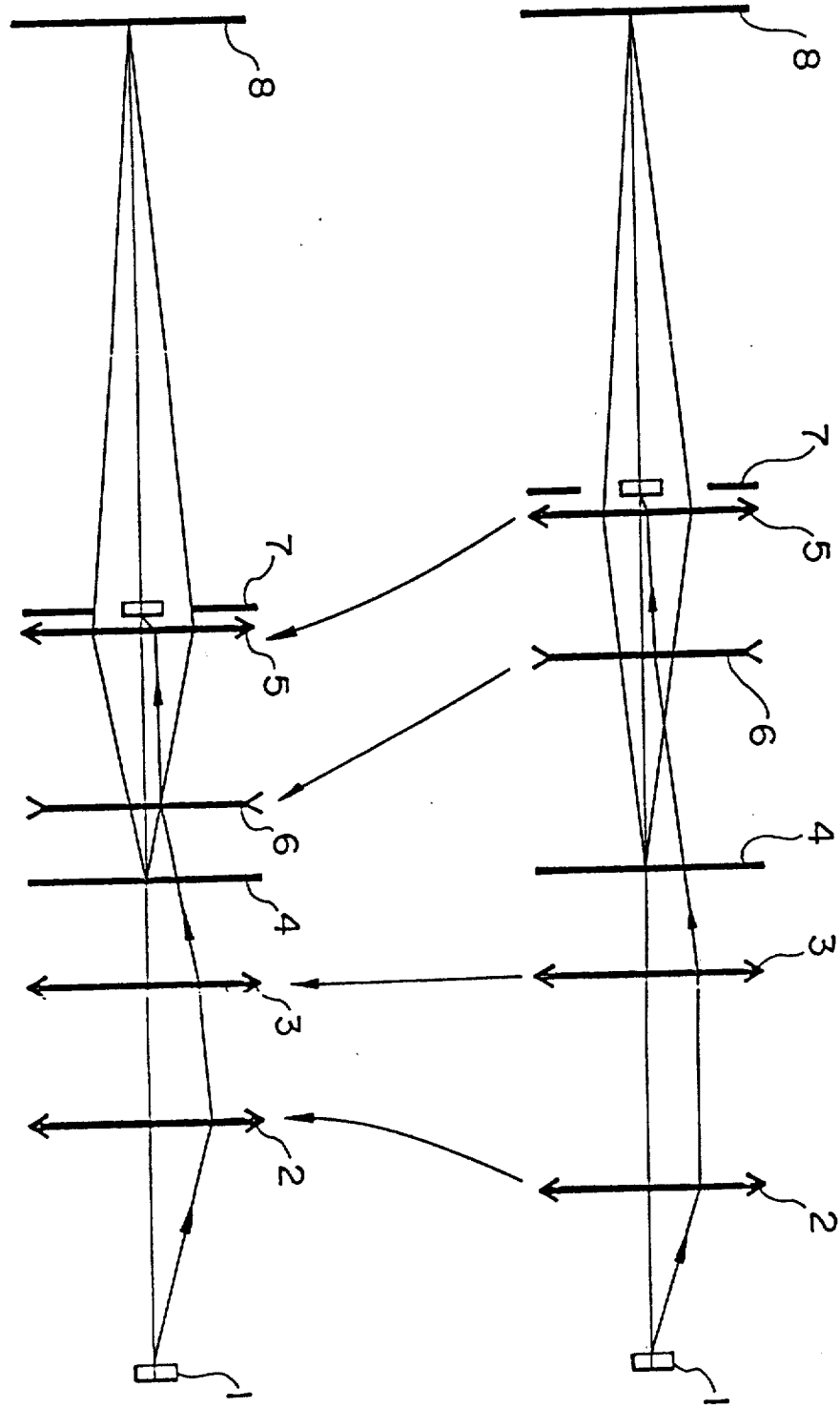
Figure 6:
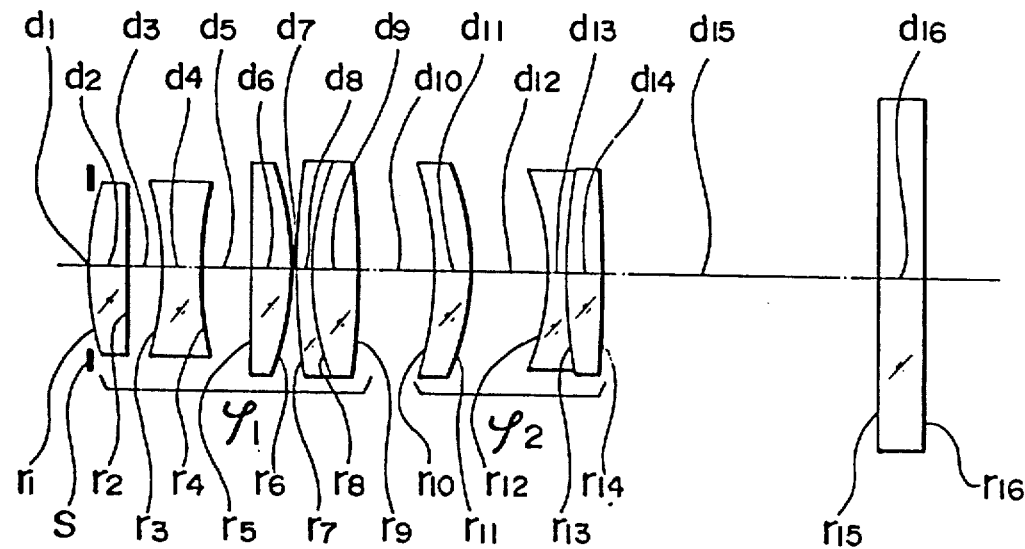
Figure 7:
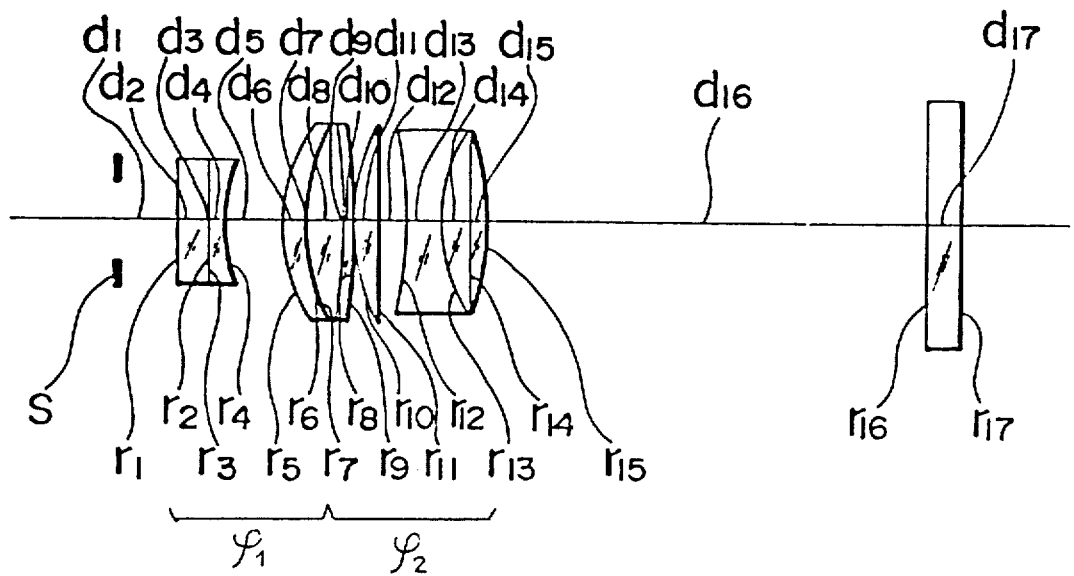

FIG. 7 shows a zoom lens system according to the second model of the present invention, which has an aperture stop S, a first lens group $\Psi_1'$ of a negative refractive power and a second lens group $\Psi_2'$ of a positive refractive power. The first lens group $\Psi_1'$ consists of a meniscus lens ($r_1$, $r_2$), a bi-concave lens ($r_3$, $r_4$) and a meniscus lens ($r_5$, $r_6$). The second lens group $\Psi_2'$ consists of a bi-convex lens ($r_7$, $r_8$) and a meniscus lens ($r_8$, $r_9$) which are cemented together, a bi-convex lens ($r_{10}$, $r_{11}$), and a bi-concave lens ($r_{12}$, $r_{13}$), a meniscus lens ($r_{13}$, $r_{14}$) and a bi-concave lens ($r_{14}$, $r_{15}$) which are cemented together.

Figure 1:
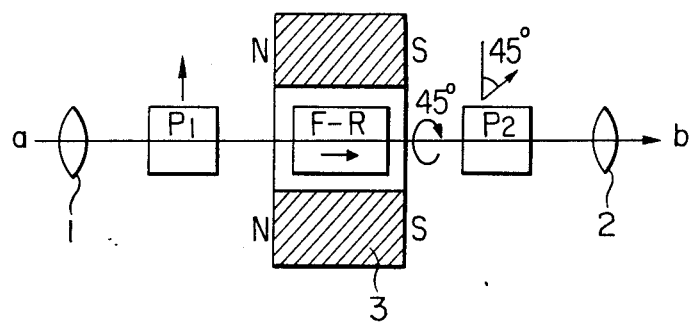
Figs. 1A and 1B are diagrams showing a conventional projecting optical system at the longest focal length side and the shortest focal length side respectively.

In both embodiments, an illumination lens system can use a conventional one such as shown in FIG. 1 in a form of fixed positions.

TABLE 1

[Embodiment 1]
f = 45.0–38.5–33.6 $F_{NO}$ = 4.2

| Radius of curvature | Axial distance | | Refractive index (Nd) | | Abbe number ($\nu d$) |
|---|---|---|---|---|---|
| S — | | | | | |
| | $d_1$ | 0.0–9.110–14.370 | | | |
| $r_1$ 25.946 | | | | | |
| | $d_2$ | 2.300 | $N_1$ 1.75450 | $\nu 1$ | 32.83 |
| $r_2$ −222.323 | | | | | |
| | $d_3$ | 2.500 | | | |
| $r_3$ −19.170 | | | | | |
| | $d_4$ | 2.650 | $N_2$ 1.68300 | $\nu 2$ | 31.52 |
| $r_4$ 32.539 | | | | | |
| | $d_5$ | 3.330 | | | |
| $r_5$ 279.336 | | | | | |
| | $d_6$ | 2.800 | $N_3$ 1.69680 | $\nu 3$ | 56.47 |
| $r_6$ −18.847 | | | | | |
| | $d_7$ | 0.400 | | | |
| $r_7$ 63.422 | | | | | |
| | $d_8$ | 1.000 | $N_4$ 1.67339 | $\nu 4$ | 29.25 |
| $r_8$ 19.545 | | | | | |
| | $d_9$ | 3.100 | $N_5$ 1.60311 | $\nu 5$ | 60.69 |
| $r_9$ −72.761 | | | | | |
| | $d_{10}$ | 5.500–9.810–14.149 | | | |
| $r_{10}$ −22.123 | | | | | |
| | $d_{11}$ | 2.400 | $N_6$ 1.80518 | $\nu 6$ | 25.43 |
| $r_{11}$ −18.141 | | | | | |
| | $d_{12}$ | 5.300 | | | |
| $r_{12}$ −17.630 | | | | | |
| | $d_{13}$ | 1.200 | $N_7$ 1.72000 | $\nu 7$ | 52.14 |
| $r_{13}$ 37.987 | | | | | |
| | $d_{14}$ | 2.500 | $N_8$ 1.66608 | $\nu 8$ | 47.95 |
| $r_{14}$ −104.456 | | | | | |
| | $d_{15}$ | 18.860–9.539–2.584 | | | |
| $r_{15}$ ∞ | | | | | |
| | $d_{16}$ | 3.000 film holder | | | |
| $r_{16}$ ∞ | | | | | |
| $\Sigma d$ = 56.810–51.798–49.183 | | | | | |

In the case where $\Psi_1 = 0.03450$, $\Psi_2 = 0.02533$, $e_1 = 14.942$, $e_2 = -11.794$, $S_1 = -1344.994$, $X_{max} = 16.276$, the equations of $y_{max} = 7.593$ and $Z = -6.778$ can be obtained. The pupil position is invariable in the zooming condition as shown by the equation of $P_I = P_{II} = -41.86$.

TABLE 2

[Embodiment 2]
f = 46.0–43.1–34.4 $F_{NO}$ = 5.6

| Radius of curvature | Axial distance | | Refractive index (Nd) | | Abbe number ($\nu d$) |
|---|---|---|---|---|---|
| S ∞ | | | | | |
| | $d_1$ | 6.000–4.785–0.274 | | | |
| $r_1$ −229.0 | | | | | |
| | $d_2$ | 2.8 | $N_1$ 1.66998 | $\nu 1$ | 39.23 |
| $r_2$ −120.8 | | | | | |
| | $d_3$ | 0.1 | | | |
| $r_3$ −300.8 | | | | | |
| | $d_4$ | 1.3 | $N_2$ 1.74400 | $\nu 2$ | 44.93 |
| $r_4$ 18.7 | | | | | |
| | $d_5$ | 6.1 | | | |
| $r_5$ 16.7 | | | | | |
| | $d_6$ | 2.2 | $N_3$ 1.80518 | $\nu 3$ | 25.43 |
| $r_6$ 17.7 | | | | | |
| | $d_7$ | 0.5–1.483–5.350 | | | |
| $r_7$ 26.7 | | | | | |
| | $d_8$ | 3.1 | $N_4$ 1.58913 | $\nu 4$ | 61.11 |

TABLE 2-continued

[Embodiment 2]
f = 46.0–43.1–34.4 $F_{NO}$ = 5.6

| Radius of curvature | Axial distance | | Refractive index (Nd) | | Abbe number ($\nu d$) |
|---|---|---|---|---|---|
| $r_8$ −59.9 | | | | | |
| | $d_9$ | 0.9 | $N_5$ 1.70055 | $\nu 5$ | 30.11 |
| $r_9$ −52.9 | | | | | |
| | $d_{10}$ | 0.1 | | | |
| $r_{10}$ 22.7 | | | | | |
| | $d_{11}$ | 2.2 | $N_6$ 1.72000 | $\nu 6$ | 50.31 |
| $r_{11}$ −1888.1 | | | | | |
| | $d_{12}$ | 3.4 | | | |
| $r_{12}$ −31.0 | | | | | |
| | $d_{13}$ | 3.0 | $N_7$ 1.70055 | $\nu 7$ | 30.11 |
| $r_{13}$ 18.4 | | | | | |
| | $d_{14}$ | 2.4 | | | |
| $r_{14}$ 138.1 | | | | | |
| | $d_{15}$ | 2.0 | $N_8$ 1.74400 | $\nu 8$ | 44.93 |
| $r_{15}$ −25.4 | | | | | |
| | $d_{16}$ | 47.6–45.05–37.49 | | | |
| $r_{16}$ ∞ | | | | | |
| | $d_{17}$ | 3.0 | $N_9$ 1.51680 | $\nu 9$ | 64.20 |
| $r_{17}$ ∞ | | | | | |
| $\Sigma d$ = 82.423–79.623–71.423 | | | | | |

In the case where $\Psi_1 = -0.035$, $\Psi_2 = 0.0433$, $e_1 = 8.87$, $e_2 = -9.01$, $S_1 = -1313$, $X_{max} = 10.11$, the equations of $Y_{max} = 5.27$ and $Z = 11.0$ can be obtained. The pupil position is invariable in the zooming condition as shown by the equation of $P_I = P_{II} = -111.00$.

According to the present invention, it is not necessary that the amount of movement of the aperture stop 7 is quite identical with the value of the condition (18). In other words, the amount of movement of the aperture stop 7 may be substantially equal to the value of the condition (18) to such a degree that the condition of Kuml/o/ hler illumination is substantially fulfilled and the desired illumination intensity is obtained on the image plane.

Here, the two-component zoom lens system having positive and negative refractive powers are explained. However, in a three- or more- component zoom lens system comprising a moving lens system which is integral with the aperture stop and is provided closer to the enlargement side compared to the first lens group of a positive refractive power, or alternatively, a fixed lens system which is not integral with the aperture stop, the pupil position at the reduction side can be invariably maintained by moving an optical aperture stop position.

As described above, in a projecting lens system wherein a projecting lens is constructed by a zoom lens system, there is no need to move a condensing lens group in an operation of zooming, thereby resulting in simplified machine parts and reduced costs. A further advantage is that the user can easily operate the lens system since he does not have to adjust the lens system for satisfying the condition of Kuml/o/ hler illumination.

What is claimed is:

1. A zoom lens system for use in an image projecting apparatus in which an image on an object plane is illuminated by Kuml/o/ hler illumination system and is enlargingly projected by a the zoom lens system to an image plane apart from the object plane by a definite distance, said zoom lens system comprising:

first and second lens groups disposed in this order from the image plane and being movable along an optical axis while maintaining a positional relationship for zooming; and an aperture stop disposed between the image plane and the first lens group and being movable so as to make the pupil position of the zoom lens system at a reduction side invariable in an operation of zooming.

2. A zoom lens system as claimed in claim 1, wherein the amount of movement Z of the aperture stop is represented by the following condition:

$$Z = \frac{(\psi_2 d - 1)(y - e_2) - \{(\psi_2 d - 1)(y - x - e_1) + d\}\{\psi_1(e_2 - y) + 1\}}{\{(\psi_2 d - 1)(y - x - e_1) + d\}\psi_1 + (\psi_2 d - 1)}$$

$\Psi_1$: refractive power of the first lens group,
$\Psi_2$: refractive power of the second lens group,
$e_1$: optical distance from the first lens group to the second lens group in the operation of zooming at the longest focal length side,
$e_2$: optical distance from the first lens group to the position of the aperture stop at the longest focal length side,
x: distance of movement of the second lens group from the longest focal length side,
y: distance of movement of the first lens group from the longest focal length side, and
d: distance from the second lens group to the pupil position at the reduction side in the case where the first and second lens group move in amounts of y and x.

3. A zoom lens system as claimed in claim 2, wherein the first lens group has a positive refractive power and the second lens group has a negative refractive power.

4. A zoom lens system as claimed in claim 2, wherein the first lens group has a negative refractive power and the second lens group has a positive refractive power.

5. A zoom lens system for use in an image projecting apparatus in which an image on an object plane is illuminated by a Kuml/o/ hler illumination system and is enlargingly projected by the zoom lens system to an image plane apart from the object plane by a definite distance, said zoom lens system comprising:
a first lens group having a positive refractive power;
a second lens group having a negative refractive power and disposed between the first lens group and the object plane;
said first and second lens groups being movable along an optical axis while maintaining positional relation for zooming; and
an aperture stop disposed between the image plane and the first lens group and being movable so as to make the pupil position of the zoom lens system at reduction side invariable in an operation of zooming.

6. A zoom lens system as claimed in claim 5, wherein the amount of movement Z of the aperture stop is represented by the following condition:

$$Z = \frac{(\psi_2 d - 1)(y - e_2) - \{(\psi_2 d - 1)(y - x - e_1) + d\}\{\psi_1(e_2 - y) + 1\}}{\{(\psi_2 d - 1)(y - x - e_1) + d\}\psi_1 + (\psi_2 d - 1)}$$

$\Psi_1$: refractive power of the first lens group,
$\Psi_2$: refractive power of the second lens group,
$e_1$: optical distance from the first lens group to the second lens group in the operation of zooming at the longest focal length side,
$e_2$: optical distance from the first lens group to the position of the aperture stop at the longest focal length side,
x : distance of movement of the second lens group from the longest focal length side,
y : distance of movement of the first lens group from the longest focal length side, and
d : distance from the second lens group to the pupil position at the reduction side in the case where the first and second lens group move in amounts of y and x.

7. A zoom lens system for use in an image projecting apparatus in which an image on an object plane is illuminated by a Kuml/o/ hler illumination system and is enlargingly projected by the zoom lens system to an image plane apart from the object plane by a definite distance, said zoom lens system comprising:
a first lens group having a negative refractive power;
a second lens group having a positive refractive power and disposed between the first lens group and the object plane;
said first and second lens groups being movable along an optical axis while maintaining a positional relationship for zooming; and
an aperture stop disposed between the image plane and the first lens group and being movable so as to make the pupil position of the zoom lens system at a reduction side invariable in an operation of zooming.

8. A zoom lens system as claimed in claim 7, wherein the amount of movement Z of the aperture stop is represented by the following condition:

$$Z = \frac{(\psi_2 d - 1)(y - e_2) - \{(\psi_2 d - 1)(y - x - e_1) + d\}\{\psi_1(e_2 - y) + 1\}}{\{(\psi_2 d - 1)(y - x - e_1) + d\}\psi_1 + (\psi_2 d - 1)}$$

$\Psi_1$: refractive power of the first lens group,
$\Psi_2$: refractive power of the second lens group,
$e_1$: optical distance from the first lens group to the second lens group in the operation of zooming at the longest focal length side,
$e_2$: optical distance from the first lens group to the position of the aperture stop at the longest focal length side,
x: distance of movement of the second lens group from the longest focal length side,
y: distance of movement of the first lens group from the longest focal length side, and
d: distance from the second lens group to the pupil position at the reduction side in the case where the first and second lens group move in amounts of y and x.

* * * * *

UNITED STATES PATENT AND TRADEMARK OFFICE
CERTIFICATE OF CORRECTION

PATENT NO.   : 4,865,431                                      Page 1 of 10
DATED        : September 12, 1989
INVENTOR(S)  : Toshihiko Ueda It is certified that error appears in the above-identified patent and that said Letters Patent is hereby corrected as shown below:

The title page should be deleted to appear as per attached title page.

In The Drawings:

delete "Figures 1 through 13" and insert attached

--Figures 1A, 1B, 2A, 2B, 3A, 3B, 4A, 4B, 5A, 5B, 6 and 7--.

Signed and Sealed this

Twenty-sixth Day of February, 1991

*Attest:*

HARRY F. MANBECK, JR.

*Attesting Officer*    *Commissioner of Patents and Trademarks*

United States Patent [19]

Ueda

[11] Patent Number: 4,865,431
[45] Date of Patent: Sep. 12, 1989

[54] ZOOM LENS SYSTEM FOR USE IN AN IMAGE PROJECTING APPARATUS WITH KÖHLER ILLUMINATION

[75] Inventor: Toshihiko Ueda, Osaka, Japan

[73] Assignee: Minolta Camera Kabushiki Kaisha, Osaka, Japan

[21] Appl. No.: 183,781

[22] Filed: Apr. 21, 1988

[30] Foreign Application Priority Data

Apr. 23, 1987 [JP] Japan ................... 62-100954
Jul. 22, 1987 [JP] Japan ................... 62-184377

[51] Int. Cl.⁴ ................... G02B 15/14; G02B 9/60; G02B 9/62
[52] U.S. Cl. ................... 350/427; 350/449
[58] Field of Search ............... 350/427, 426, 412, 449, 350/464

[56] References Cited

U.S. PATENT DOCUMENTS 4,278,334 7/1981 Maeda .
4,433,906 2/1984 Nakatami et al. .

FOREIGN PATENT DOCUMENTS 57-73715 5/1982 Japan .
0183613 8/1986 Japan ................... 350/449

Primary Examiner—Bruce Y. Arnold
Assistant Examiner—Rebecca D. Gass
Attorney, Agent, or Firm—Price, Gess & Ubell

[57] ABSTRACT

The disclosure relates to a zoom lens system for use in an image projecting apparatus with Köhler illumination. In this system, an aperture stop is movably provided relative to the movement of a first and second lens groups in an operation of zooming so as to make a pupil position of the zoom lens system at a reduction side invariable, with the result that Köhler illumination system is not moved.

8 Claims, 6 Drawing Sheets

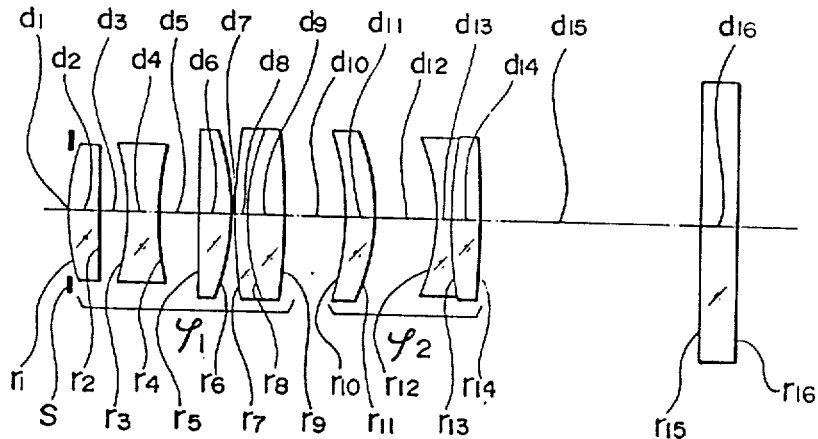

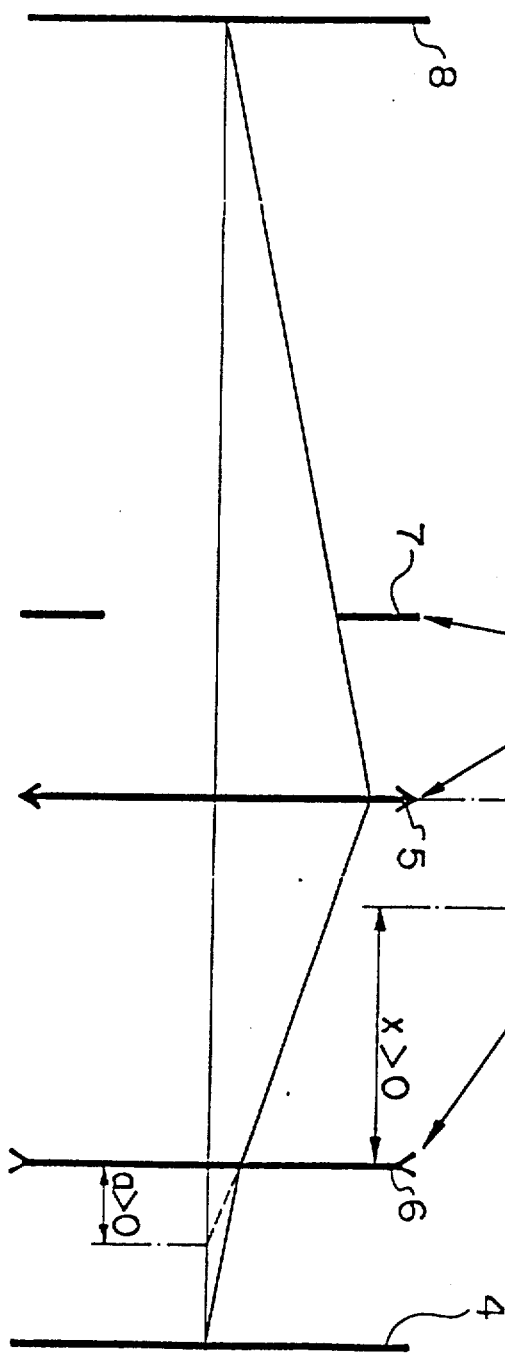
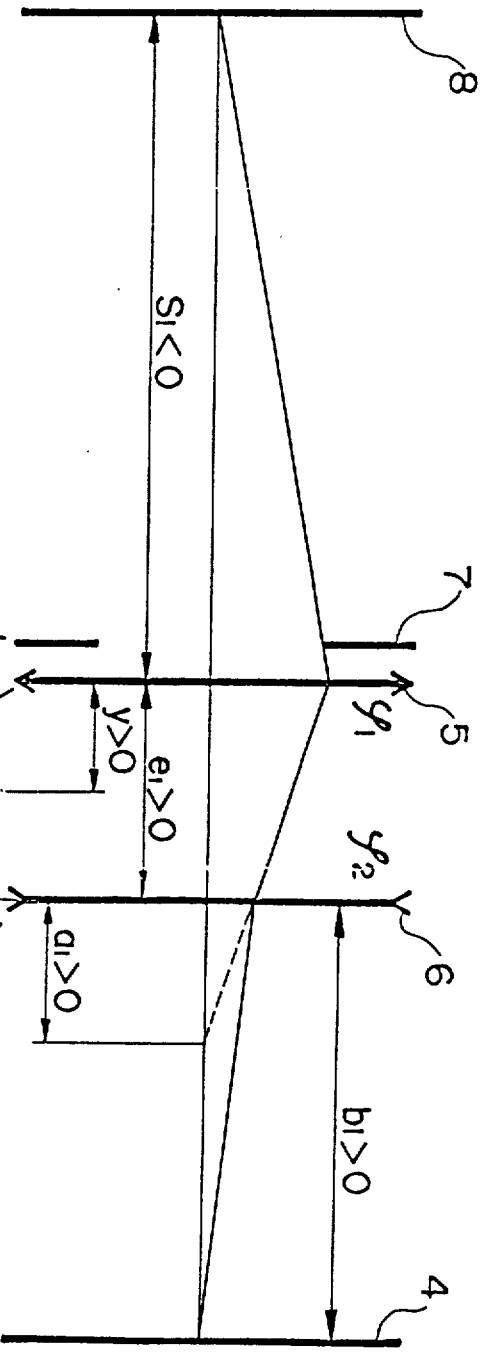

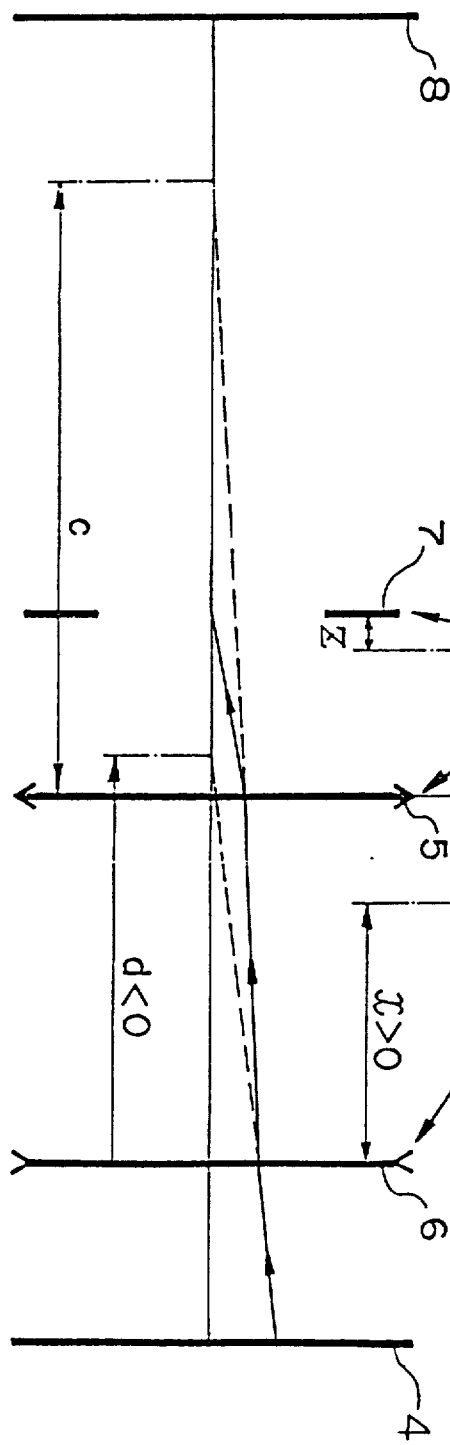
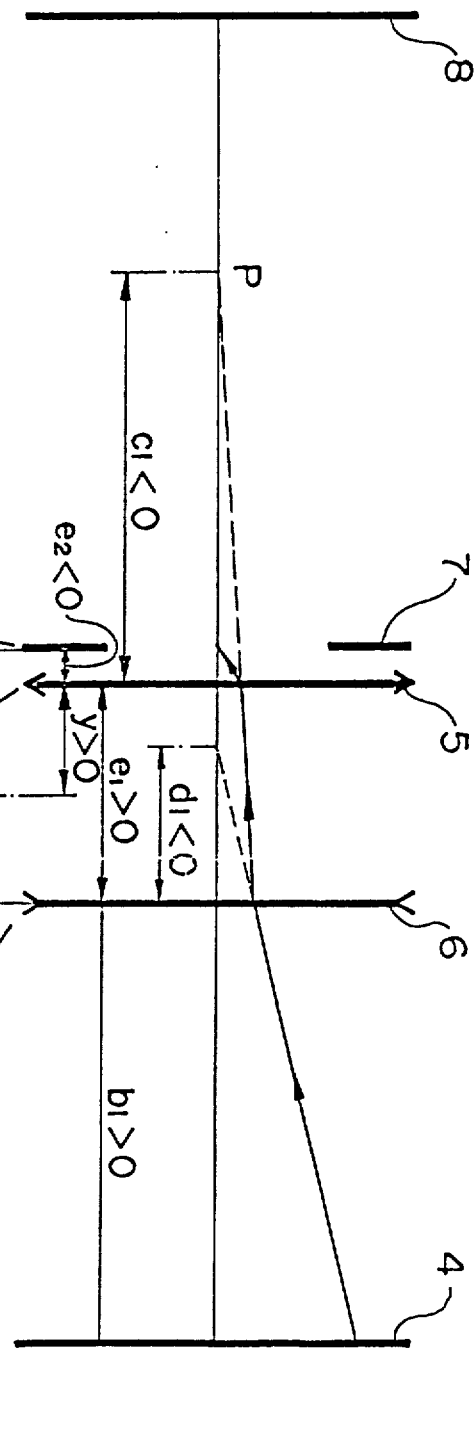
Fig. 3A
Fig. 3B

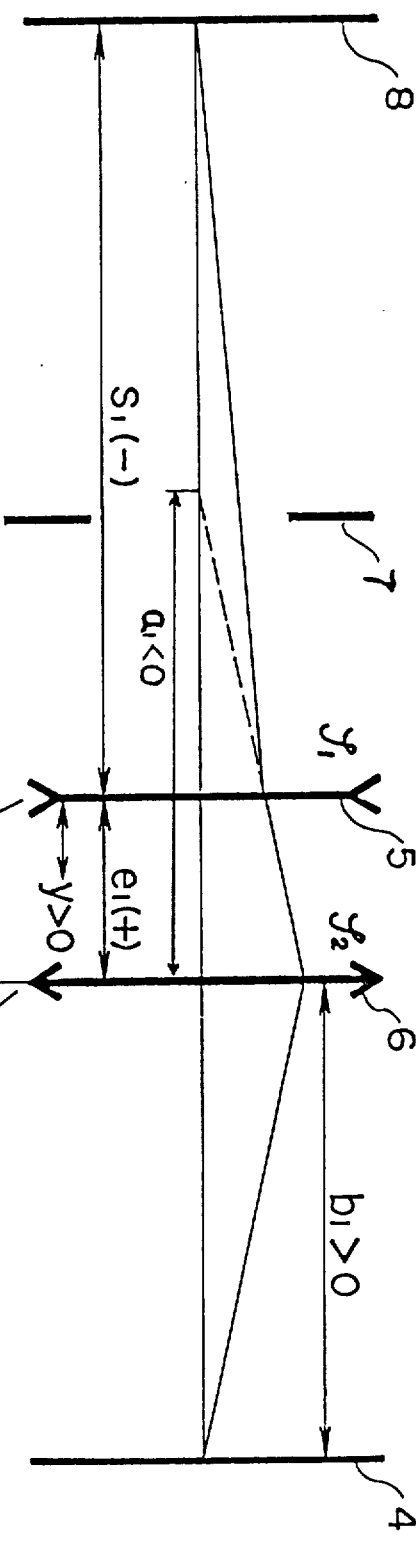
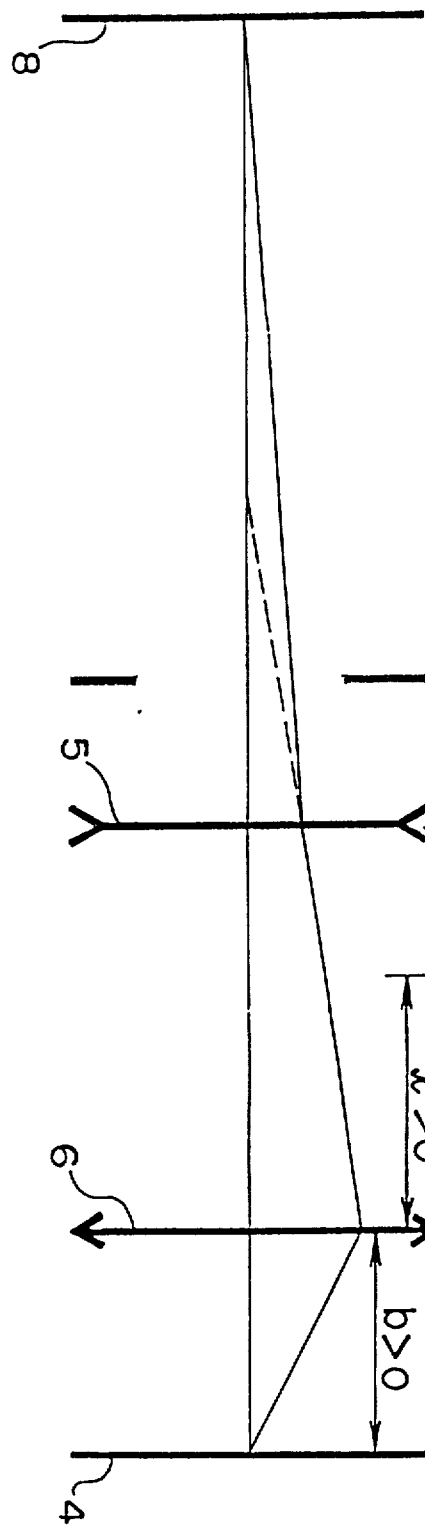
Fig. 4A
Fig. 4B

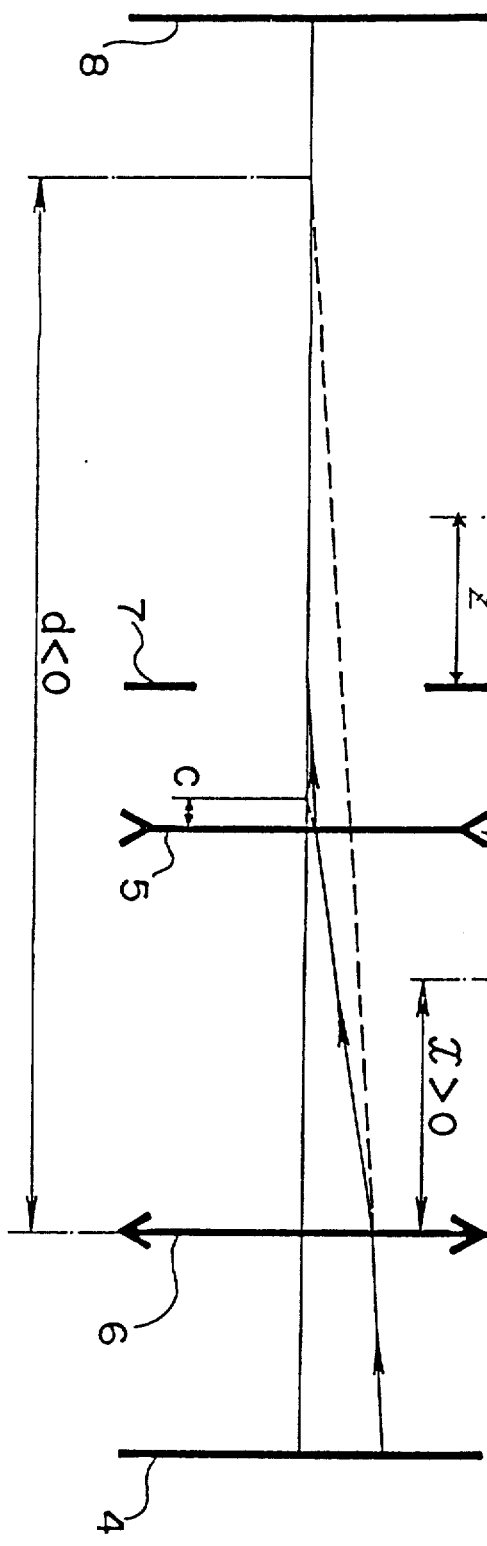
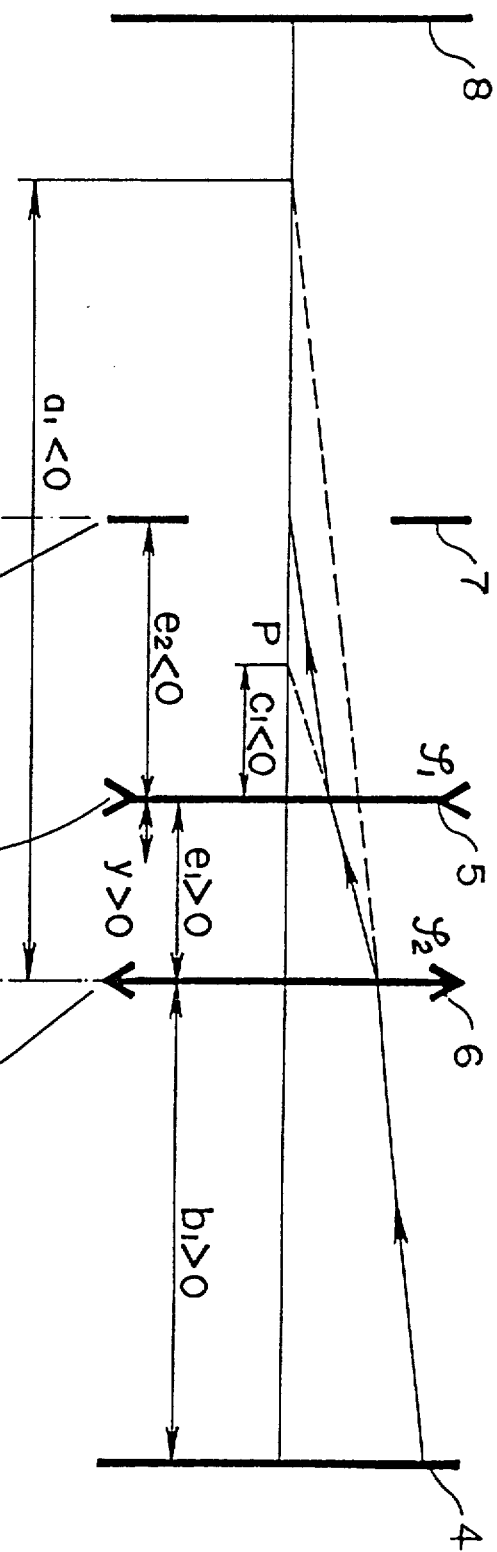
Fig. 5A
Fig. 5B

UNITED STATES PATENT OFFICE
CERTIFICATE OF CORRECTION

Patent No. 4,865,431　　　　　　　　Dated September 12, 1989

Inventor(s) Toshihiko Ueda

It is certified that error appears in the above-identified patent and that said Letters Patent is hereby corrected as shown below:

Col. 1, line 10, delete [Kuml/o/] and insert --Köhler--;

line 11, delete [hler];

line 14, delete [Kuml/o/ hler] and insert --Köhler--;

line 16, delete [Kuml/o/ hler] and insert --Köhler--;

line 18, delete [Kuml/o/ hler] and insert --Köhler--;

line 22, delete [Kuml/o/ hler] and insert --Köhler--;

line 25, delete [Kuml/o/ hler] and insert --Köhler--;

line 41, delete [Kuml/o/] and insert --Köhler--;

line 42, delete [hler];

line 50, delete [Kuml/o/ hler] and insert --Köhler--;

line 55, delete [Kuml/o/ hler] and insert --Köhler--;

line 57, delete [Kuml/o/ hler] and insert --Köhler--;

line 67, delete [Kuml/o/ hler] and insert --Köhler--;

Col. 1, line 68, delete [Kuml/o/ hler] and insert --Köhler--.

Col. 2, line 5, delete [Kuml/o/ hler] and insert --Köhler--;

line 12, delete [Kuml/o/ hler] and insert --Köhler--;

UNITED STATES PATENT OFFICE
CERTIFICATE OF CORRECTION

Patent No. 4,865,431          Dated September 12, 1989

Inventor(s) Toshihiko Ueda

It is certified that error appears in the above-identified patent and that said Letters Patent is hereby corrected as shown below:

Col. 3, line 5, delete [Kuml/o/ hler] and insert --Köhler--;

Col. 4, line 7, insert --($\beta_2 > 0$)--;

line 19, insert --($\beta_1 < 0$)--;

line 44, delete "hereinbellow" and insert

--hereinbelow--.

Col. 5, line 16, insert --($P_I < 0$)--;

Col. 8, line 35, delete [Kuml/o/ hler] and insert --Köhler--;

line 55, delete [Kuml/o/ hler] and insert --Köhler--;

line 60, delete [Kuml/o/ hler] and insert

--a Köhler--;

Col. 9, line 35, delete [Kuml/o/ hler] and insert --Köhler--;

line 48, after "maintaining" insert --a--;

line 48, delete "relation" and insert

--relationship--;

line 53, before "reduction" insert --a--.

Col. 10, line 21, delete [Kuml/o/ hler] and insert --Köhler--.